United States Patent [19]

Ramot et al.

[11] Patent Number: 5,341,412
[45] Date of Patent: Aug. 23, 1994

[54] APPARATUS AND A METHOD FOR PREDICTIVE CALL DIALING

[75] Inventors: Danny Ramot, Fairfield; George Chen; Alexander Henkin, both of Stamford, all of Conn.

[73] Assignee: Executone Information Systems, Inc., Darien, Conn.

[21] Appl. No.: 774,600

[22] Filed: Oct. 10, 1991

[51] Int. Cl.⁵ .............................................. H04M 11/00
[52] U.S. Cl. ...................................... 379/92; 397/216; 397/265
[58] Field of Search ................. 379/92, 93, 94, 96–98, 379/216, 218, 265, 266, 309, 201, 159, 395, 387

[56] References Cited

U.S. PATENT DOCUMENTS

| | | | |
|---|---|---|---|
| 3,989,899 | 11/1976 | Norwich | 379/96 |
| 4,375,582 | 3/1983 | Gist et al. | 379/96 |
| 4,640,989 | 2/1987 | Riner et al. | 379/96 |
| 4,817,130 | 3/1989 | Frimmel, Jr. | 379/216 |
| 4,860,342 | 8/1989 | Danner | 379/96 |
| 4,881,261 | 11/1989 | Oliphant et al. | 379/265 |
| 4,894,857 | 1/1990 | Szlam et al. | 379/216 |
| 4,896,345 | 1/1990 | Thorne | 379/266 |
| 4,975,949 | 12/1990 | Wimsatt et al. | |
| 5,181,236 | 1/1993 | LaVallee et al. | 379/216 |

*Primary Examiner*—Wing F. Chan
*Attorney, Agent, or Firm*—Dilworth & Barrese

[57] ABSTRACT

A predictive dialing system automatically initiates a series of live telephone calls for its agents. Each agent's work area includes a telephone set including a headset for establishing a voice communications channel between the agent and a customer. The agent's work area also includes a computer terminal having a display device and an input device. The computer terminals are coupled to a server computer via a network. The server computer is also coupled to an automatic dialer and to a private branch exchange. When the server assigns a call to a agent, it sends information about the party called to the agent's display terminal. The agent enters data into the input device while talking to the called party. The system allows the agent to control all telephone functions from the display terminal input device, including volume adjustment, mute and unmute, release and disconnect. The agent can dial and control additional calls using the display terminal input device, including central office calls, intercom calls and paging. The system maintains a steady sequence of calls by use of a feedback mechanism to adjust the scheduling of calls. As each call is initiated or completed, system parameters are adjusted to maintain a predetermined minimum number of busy agents. The adjustments also maintain the percentage of unattended calls (for which no agent is available).

3 Claims, 6 Drawing Sheets

APPARATUS AND A METHOD FOR PREDICTIVE CALL DIALING

FIELD OF THE INVENTION

This invention relates generally to telephone systems, and particularly to a predictive dialing system intended for use in an outbound telemarketing environment.

BACKGROUND OF THE INVENTION

Automated dialing systems have enhanced the productivity of telemarketing personnel in businesses, political and charitable organizations by increasing the number of customer contacts each agent can make. Prior to the advent of predictive dialing systems, telemarketing agents typically selected telephone numbers from a hardcopy listing. The agents manually dialed these numbers. Most of these manually initiated calls did not result in a contact with the targeted individuals. The primary reasons for the failure of these calls were: there was no answer; the line was busy; or the agent dialed the wrong number. Even successfully completed calls used the agents' time inefficiently, since the agents were required to dial the number and wait for the call recipient to answer.

Automated dialing systems eliminated these unproductive uses of the agents' time. In the automated systems, the numbers are dialed under control of one or more computers. The dialing systems recognize rings, busy signals and answers. The systems also detect whether each agent is currently engaged in a call, or is idle. A call is not transferred to an agent until an answer is detected by the system and the agent is idle. The agents are thus provided with a steady stream of answered calls. Automated dialing ensures uniform coverage within the range of telephone numbers targeted.

U.S. Pat. No. 4,438,296 to Smith discusses a typical automated telephone polling method in which telephone numbers are selected from a queue on the basis of least prior unsuccessful attempts at calling each telephone number. Given an automatic dialer capable of simultaneously dialing a fixed number of telephone numbers, this method enhances the frequency of successfully completed calls. Once a call is answered, the system plays back one of a plurality of prerecorded messages, with the ability to associate specific messages with specific phone numbers. The system selects the order in which numbers are dialed to achieve a desired message playback sequence. Playing back messages in a predetermined sequence allows the system to minimize repositioning of the magnetic media on which the recorded messages are stored. This reduces the wear in the magnetic media.

Some of the automated dialing systems provide further assistance by displaying softcopy information to the agent while he talks to a called party. Substantial amounts of information can be provided to the operator without wasteful storage and handling of the data in hardcopy. For example, U.S. Pat. No. 4,599,493 to Cave discusses a system in which a plurality of agents are each provided a bi-directional audio communications device and a display terminal connected to a central host computer. The host computer provides a group of telephone numbers to a controller. Each number is dialed by the controller, which also detects rings, busy signals and voice answers. Upon detection of a voice answer, the called line is connected to an idle operator. At the same time, the host computer provides information about the call recipient to the operator via the display terminal. As the operator receives information from the called party, he can enter it into the terminal for transmission to the host.

In order to maximize the time each agent spends talking, an automated dialing system has to provide an answered call almost immediately after an agent becomes idle. This often requires the dialing system to start dialing a call before an agent is available. Selecting the time to initiate the call is a non-deterministic process. The length of time before the called party answers the phone and the length of time before an operator becomes available are both unknown. Systems which use this technique are called "predictive dialing systems".

Because customer answer time and agent availability time are unknown, the predictive dialing system may dial a call early, so that the called party answers before an agent is available. Two alternatives are available in this "unattended call" situation. The system can terminate the call immediately. This alternative wastes the opportunity to talk to the called party. In the second alternative, the system can play a recording and put the called party on hold until an operator is available. The advantage of this alternative is that the agents are provided with a continuous sequence of answered calls. On the other hand, placing a called party on hold can reduce the customer's receptiveness to the agent's message, and some potential customers will grow impatient and hang up. Neither of the two alternatives is totally satisfactory; the best solution is to avoid unattended calls in the first place.

Predictive dialing systems employ scheduling algorithms which attempt to provide answered calls just as agents become available to service them. For example, U.S. Pat. No. 4,829,563 to Crockett et al. discusses a predictive dialing method which reduces the number of unattended calls. In this method, the system periodically monitors the number of active conversations, the number of pending calls (dialed but not yet answered) and the number of idle agents in the system.

The Crockett system generates a prediction of the number of calls which will be answered at the end of a predetermined time interval, and the number of agents who will be idle at the end of the same interval. The predicted number of calls includes the portion of the pending calls that are answered, plus additional calls to be dialed during the interval, plus a "weighting factor." The predicted number of idle agents includes those idle agents who are not assigned calls during the interval, plus additional busy agents who complete their calls. The system adjusts the rate at which new calls are dialed based on comparisons between the weighted predicted number of calls and the predicted number of agents.

Previous automated dialing systems did not provide the agent full telephone key pad functionality through the computer terminal input devices (keyboard or mouse). The agents were forced to divert their attention from the computer terminal to the telephone in order to adjust volume, mute the call, hang up, terminate the call, or dial a number manually. This interfered with the agents' ability to carefully record data gathered during conversations with called parties.

SUMMARY OF THE INVENTION

The present invention is embodied in a predictive dialing system comprising a mainframe or data source, a file server or network controller, an automatic dialer, and a plurality of agent stations which include a workstation and a voice communications device. Each agent station provides full telephone keypad functionality within the same computer workstation used for recording data gathered from called parties. This method allows the agent to focus attention more productively on conversing with customers and recording data. In addition to volume adjustment, mute, hang up, and terminate, the agent can manually initiate central office calls. Within the agent's office, both intercom calls and paging are also initiated from the workstation. These functions are provided on a non-interference basis so that regular telephone sets may also be employed for these phone functions if the agent so chooses.

The present invention provides additional functions for agents who must schedule appointments with the parties called (e.g., telephone campaigns to schedule blood donation appointments). A calendar function is provided to display the dates for which appointments are available. Once a date is selected and entered into the workstation, the available time slots are automatically displayed. The calendar function automatically updates the database of remaining available appointments with each appointment scheduled.

Agent productivity is further enhanced by improved scheduling methods. The rate and times at which calls are dialed closely tracks the rate and times at which agents become available to respond to the calls. The system provides optimal call scheduling with two alternative methods for responding to calls which are completed before an agent is available. The system administrator can choose to immediately terminate these calls, or to play a recording until an agent becomes available. The administrator can also configure the system and adjust the scheduling rate to reduce the occurrence of these unattended calls to the level desired.

DETAILED DESCRIPTION OF THE EXEMPLARY EMBODIMENT

The following is a description of an exemplary automated dialing system in accordance with the present invention.

Figure 1:
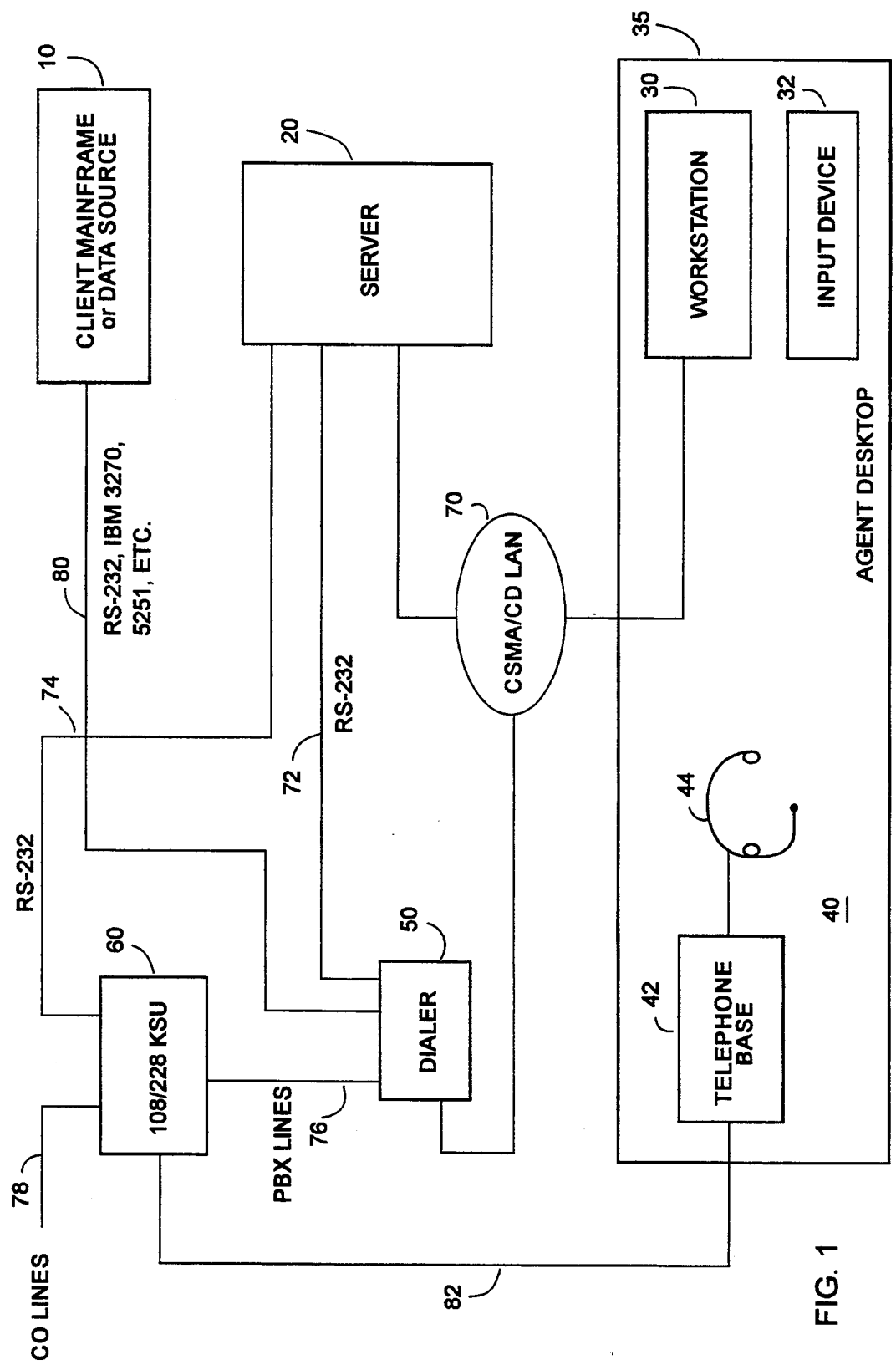
FIG. 1 is a block diagram showing the hardware components of the predictive dialing system.

FIG. 1 shows a block diagram of a hardware configuration operating the predictive dialing system. The system serves a plurality of agents who may be employed in telemarketing, charity campaigns, political canvassing, surveys, debt collection, or other activity requiring a large number of direct telephone calls to the public.

Each agent has a work area such as desktop 35. The desktop includes a computer video display terminal 30 and an input device 32, such as a mouse or a keyboard. Although the invention can be implemented using a fixed function display terminal or personal computer, an intelligent workstation (e.g., an IBM AT compatible personal computer having an Intel 80386 microprocessor and operating under control of the Xenix 386 operating system) is used in the exemplary embodiment. The agent desktop 35 also includes a digital telephone set 40 including at least a base 42 and a headset 44. The telephone set 40 can be single line, multikey, or multikey with a display.

The agent workstations 30 are connected to a server computer 20 (e.g., a computer identical to one of the workstation computers) via a standard Local Area Network (LAN) 70 protocol, such as Carrier Sense Multiple Access with Collision Detection (CSMA/CD) protocol. Other server computers and LAN protocols are also contemplated for the predictive dialing system.

In addition to the LAN interface, the server computer 20 is connected to an automatic dialer 50 for example, an Infostar dialer available from Executone Information Systems, Inc., via a standard RS-232 interface 72 and to a private branch exchange (PBX) 60, which may be, for example, a Key Set Unit (KSU) such as the ISOETEC 108/228 communications processor also available from Executone Information Systems Inc. The automatic dialer 50 is connected to PBX 60 by lines 76, and controls the PBX. It provides the digital dialing input to the PBX 60 and monitors the calls, providing server computer 20 with call status. In particular automatic dialer 50 notifies server 20 when line busy, ring-no-answer, and live-call status are detected.

In addition to the automatic dialer 50, the PBX 60 interfaces to a plurality of agent telephones 40 having bases 42 and headsets 44 and to Central Office (CO) lines 78. The PBX 60 produces the Dual Tone Multifrequency (DTMF) signal required to initiate a call on the CO lines, in response to signals provided by the automatic dialer 50 over lines 76.

The server computer 20 receives a daily download of target telephone numbers and appointment data at the beginning of each day, from a data source computer 10, such as a mainframe or mid-sized computer. These telephone numbers are stored in the server computer so that no further interactions between the server 20 and the data source computer 10 are required for the remainder of the business day. At the end of the business day, the server computer 20 uploads a record of the day's activity back to the data source computer 10. In the exemplary embodiment, it is not necessary to provide a direct communications link between the server computer 20 and the data source computer 10. The automatic dialer 50 includes the hardware or firmware needed to do protocol conversion between the server protocol 72 and the data source computer protocol 80.

In this configuration, the dialer 50 provides the interface between the server 20 and the agent's mainframe computer 10. This is appropriate since the dialer 50 is only used as an interface to transfer data between the mainframe computer 10 and the server 20 at the start or end of a campaign, that is to say, when its dialer functions are not being used. Alternatively, a direct connection may be established between the mainframe computer 10 and the server 20.

The typical method of operation of the system is described in the following paragraphs. The data is downloaded from the data source 10 to the server 20 for one or more campaigns. The agents who have logged in for the day are each assigned a campaign attribute in the server's database, so that each agent will only be assigned calls from a single campaign. The server 20 sorts the telephone numbers it receives into campaigns and transmits these numbers, one per call, to the automatic dialer 50. The dialer dials the number, providing an output signal over lines 76, which is translated into DTMF tones by PBX 60. The DTMF tones initiate a connection over the central office lines 78.

The PBX also provides signals to the automatic dialer 50, indicating whether the call status is busy, ringing, or a "live call." The automatic dialer 50 in turn provides the status information to the server computer 20. If the server 20 is notified of a live call, the server 20 determines whether an agent is available, i.e., he is logged on, is not currently engaged in a call, and has set his status to available through manual input to the workstation 30. If two or more agents are available, the call is assigned to the agent who has been available for the longest time.

Having selected the agent, the server provides control codes to the PBX 60 indicating the telephone set to which the call will be transferred. These control codes are provided to a control input port of the PBX, such as the port which would be used to connect the PBX 60 to an automated attendant. PBX 60 responds to these control codes by transferring the call to the appropriate telephone set 40. PBX 60 provides a unique triple beep signal to the telephone set 40, indicating that the transfer of a live call will follow immediately. This prepares the agent to respond to the called party's greeting as though the agent has heard it; actually, the greeting is generally completed by the time the transfer of the call to the agent is complete.

While the call is being transferred to the agent, the server computer 20 is simultaneously transferring data records to the agent's workstation 30. The workstation 30 displays basic called party information (e.g., name, address, and phone number) which allows the agent to establish the identity of the called party before proceeding further with the call.

After providing the called party's identity, the workstation 30 displays more detailed information for processing the call, and provides input fields into which the agent can enter responses to predetermined questions via input device 32, for example, a computer keyboard or a mouse pointer device.

The present invention provides the agent with full telephone keypad functionality in the display terminal 30. The agent is focused on the dual tasks of simultaneously maintaining a conversation and entering data into the terminal 30. The ability to perform these tasks without error is improved if the agent does not have to divert his hands from the input device 32 or his attention from the display terminal 30 in order to operate the telephone set 40.

During any ongoing call, the agent can use the input device 32 to adjust the volume of the call up or down, completely mute the agent's voice transmission, or restore the agent's voice transmission (unmute) when it is muted. Using only the input device 32, the agent can release the call without disconnecting (flash), to simulate the operation of the telephone hookswitch, and disconnect (hangup) from the called party.

In addition to the functions provided during calls, the present invention allows the agents to originate intercom calls, CO calls and pages from their terminal input device 35 without pressing any of the keys on the base 42 of the telephone set 40. When intercom calls (handled by the PBX) and CO calls are made, the entire phone number is entered at the keyboard 32 followed by a carriage return. The number appears on the display 30 as it is entered. Then it is translated into control codes and transferred to the PBX 60.

Unlike dialing the number using the telephone set 40, the agent can erase incorrect numbers with the backspace key and re-enter them. After the entire dialed number or other function is entered correctly, the server reformats the message into a set of control codes for the PBX 60. These control codes are applied to the control input port of the PBX 60 which performs the function requested by the operator.

The present invention enables a agent to broadcast a message to any one of 9 page zones serviced by the PBX, or to all 9 zones simultaneously, under keyboard control. Two different kinds of paging are available. With the first type (internal paging), messages are transmitted to zones where telephones are installed. Messages are heard through the speakers in the paged telephone headsets 44.

The second type of paging is external paging. External paging messages are broadcast through external loudspeakers independent of the telephone extensions. This is useful in locations where telephone extensions are not installed, or in zones beyond the audible range of internally paged messages from telephone extensions.

An added feature of the paging function allows the paged party to rapidly establish a connection with the paging party. The agent requests in his paging announcement that the paged party should dial a two digit code from any phone. The agent remains on the line after completing his announcement. When the two digit code is dialed, the paged party is immediately connected to the agent.

The method for controlling the phone functions from the input device 32 is as follows. Input device 32 commands cause the transfer of a message to the server 20 via the LAN 70. This message identifies what key has been pressed. If the message entails pressing a number of keys, these are collected in the server until a carriage return is received. In response to this message, the server computer 20 puts the command in a format suitable for the control port of the PBX 60 and sends the command over line 74 to PBX 60.

The control input port of the PBX 60 is the same port that would be used if the PBX 60 were connected to an external control device, such as an automated attendant. The format of the control message is different for different types of PBX and so, is not described in detail.

Line 74 between server 20 and PBX 60 operates in parallel with line 82 between the telephone set 40 and the PBX 60, so that the capability to control phone operation via the key pad on the telephone base 42 is not degraded.

Figure 1A:
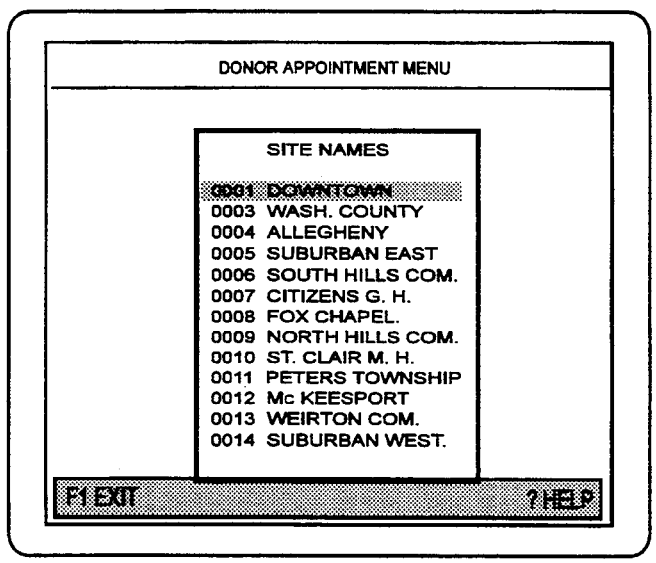
FIGS. 1a through 1c are screen format diagrams which illustrate scheduling menus that may be displayed on the display device of the system shown in FIG. 1.
Figure 1B:
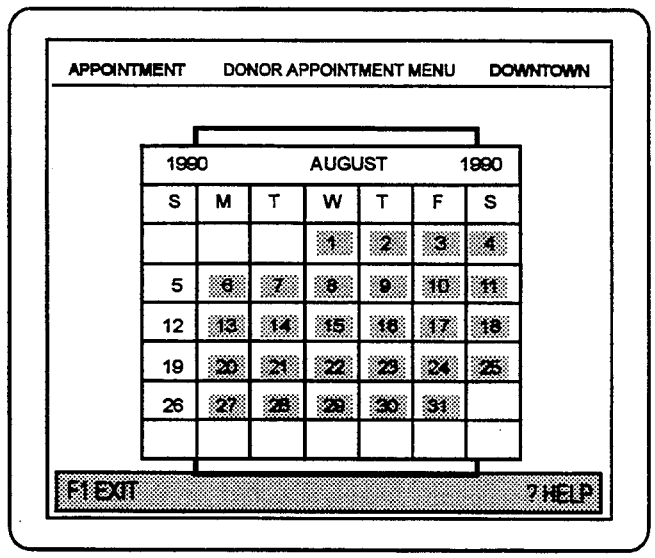
Figure 1C:
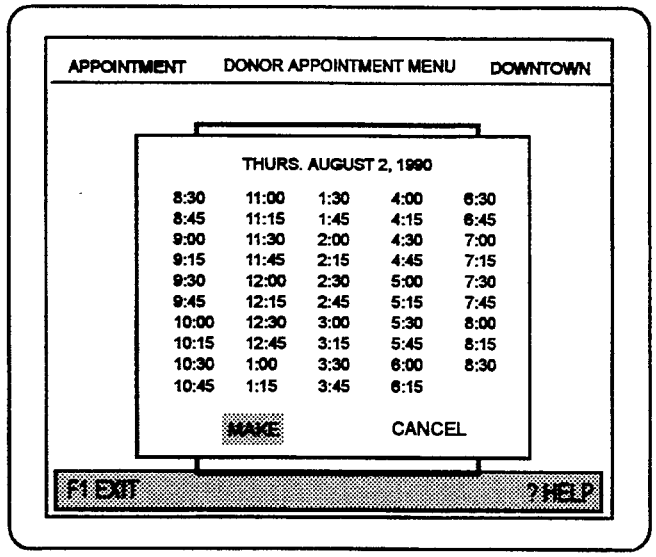

A further advantageous feature of the system is the automated calendar tool with which agents schedule appointments for the called parties. This is particularly useful for campaigns such as blood drives, in which successful calls result in appointments. The predictive dialing system maintains an appointment database. Once the calendar tool is initiated, the locations at which the called parties may be served are displayed on the workstation 30 display via a pop-up menu such as that shown in FIG. 1a. The agent enters the party's choice of location via input device 32 and a further pop-up menu, shown in FIG. 1b, displays a monthly calendar in which days having available time slots at the chosen appointment site are highlighted. The agent enters the party's choice of date via input device 32 and a further pop-up menu, shown in FIG. 1c, displays a listing of the available time slots for the chosen date. The system allows multiple appointments to be scheduled for each time slot in accordance with the number of parties actually served at once. If this capability is used, the system automatically updates the calendar function database to keep track of the number of available appointments for each time slot at each location. Finally, the calendar function allows the agent to cancel a previously scheduled appointment using the same pop-up menus described above.

In addition to the new agent functions described in the above description, the predictive dialing system employs improved scheduling methods. These methods result in a high percentage of each agent's time being spent in productive conversation. Another measure of the value of the scheduling method is the frequency with which a live call is established with no agent available to attend to the call. The predictive dialing system allows the system administrator to choose from two alternative methods for handling these "unattended" calls. The system can be set up to drop (i.e., disconnect from) a live call as soon as it is determined that no operator is available. Alternatively, unattended calls may be placed in a queue, so that agents are assigned to the queued calls on a first-in, first-out (FIFO) basis as the agents become available.

The selection of whether to allow queueing of unattended calls is based on an assessment of the impact the delays will have on the overall success of the campaign. In a typical campaign, only about 50% of the calls dialed result in live connections with a called party. The bulk of the calls result in a busy signal or a ring without answer. Given this situation, there may be reluctance to drop a call once it is established. On the other hand, requiring the called party to wait may result in reduced receptiveness for the agent's message. In some cases the called party even hangs up before the agent becomes available. Whichever method is selected, the predictive dialing system minimizes the number of unattended calls.

Figure 2:
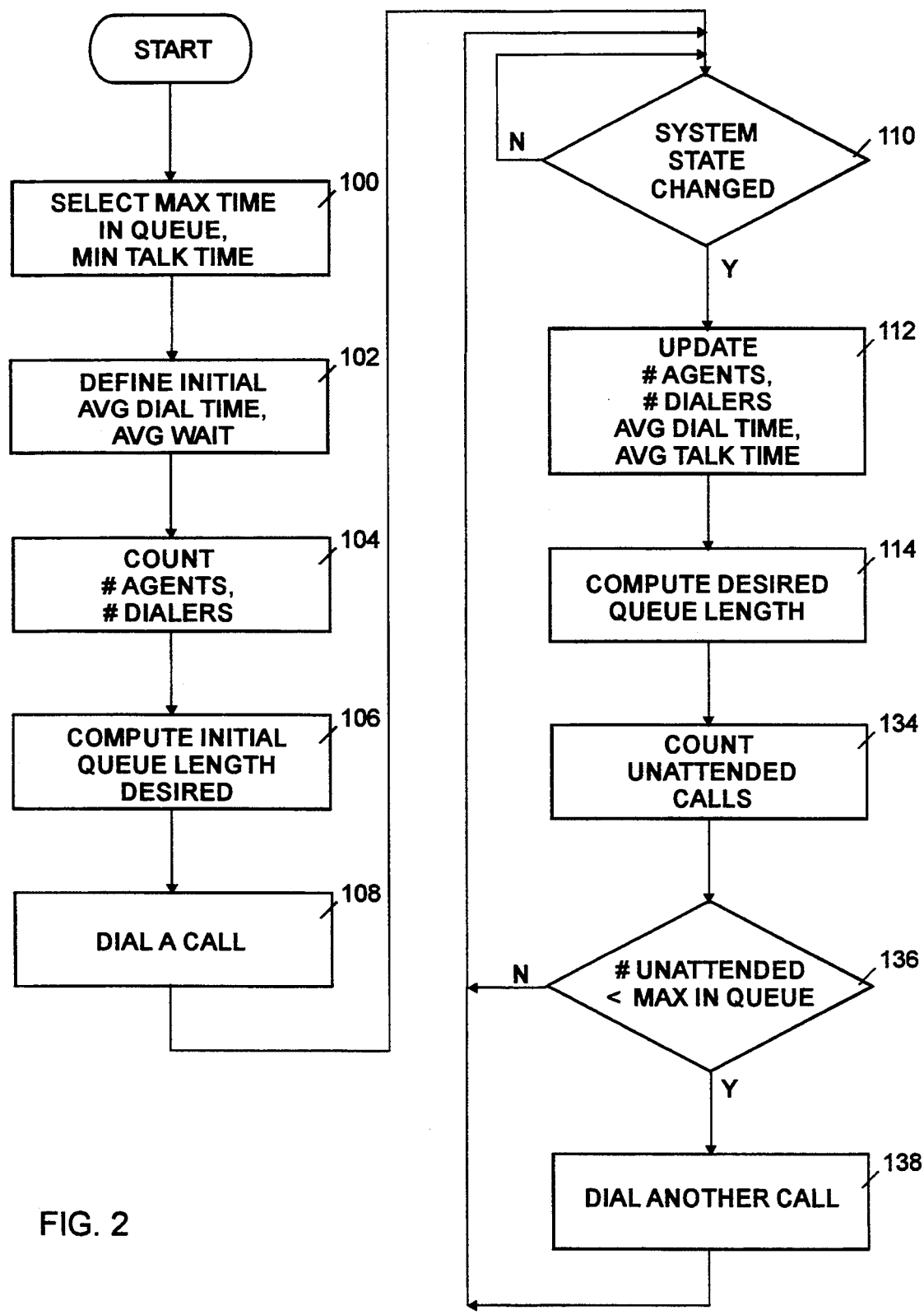
FIGS. 2 and 2a are flow chart diagrams for the scheduling method used in the system shown in FIG. 1, when unattended calls are placed on hold till an operator is available.

FIG. 2 shows a flow chart of the scheduling method for the predictive dialing system with a call wait queue. At step 100, the system administrator selects initial operating parameters for the system. The two parameters which are used as to measure the quality of service are 1) the time a called party must wait for an agent after answering the phone and 2) the percentage of time that each agent spends engaged in conversation with called parties. It is desirable to minimize the maximum time that a party must wait while maximizing the number of agents that are attending to called parties at any given time. These goals are conflicting, however, since if the queue of waiting calls is empty then agents are likely to be idle while if agents are being fully utilized, it is likely that clients are spending excessive amounts of time waiting for an operator to become available. To be effective, the system desirably achieves a balance between these two competing goals.

At step 102, the administrator enters initial estimates for the average dialing time per call and the average time spent by the agent per conversation. The average dialing time includes actual dialing time, plus the time spent waiting for an answer. Failed calls (busy and ring with no answer) are included in the average. The average time spent by the agent per conversation includes a brief period between calls known as "wrap up," during which the agent is not available to answer additional calls. During this period, the agent may take a short break or may finish any data entry associated with the last call. These estimates may initially be provided using modelling data or estimates based on results from other campaigns or other installations.

Figure 2A:
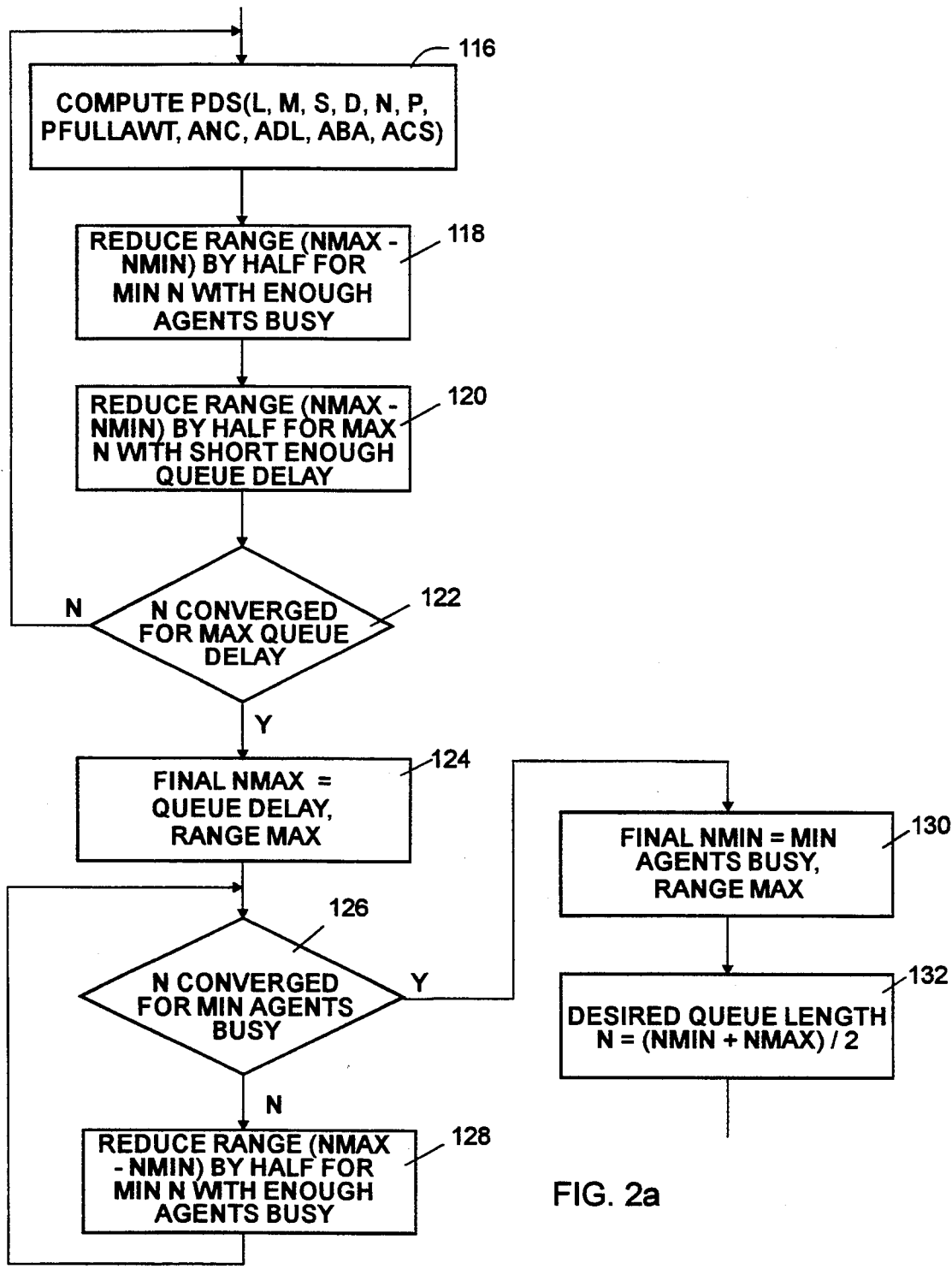

At step 104, the system counts the number of agents currently available to receive calls and the number calls that can be initiated by the automatic dialer 50. At step 106, an initial average queue waiting time is computed based on the previously calculated parameter values. The specific algorithm used is described below with reference to FIG. 2a.

At step 108, with all initial parameters set, the system is ready to begin automatic dialing of calls. At step 110, the system is in a wait state until a state change occurs. A state change may be the called party answering a call, an agent beginning a conversation, completion of a conversation, or a change in the number of active agents or the number of calls that can be initiated by the dialer. At step 112, when any one of these state changes occurs, the number of active agents and the number of active calls for the dialer are counted. The average dial time and the average time a called party waits for an agent after answering are updated with the new results.

At step 114, the system employs its scheduling method to update the desired maximum number of called parties waiting for an agent at any given time. Step 114 comprises detailed steps 116 through 132, shown in FIG. 2a. The scheduling method is based upon modelling the predictive dialing system as a time homogeneous Markov process, also known as a birth and death process. This model defines the behavior of the system in terms of its current state without regard to the details of its history at each previous point in time. The birth and death process is described in detail in a textbook by H. M. Wagner entitled *Principles of Operations Research*, Prentice Hall, 1969, pp 869–875, which is hereby incorporated by reference.

The general steady-state behavior of the homogeneous Markov process is described by equations (1) and (2):

$$L(n-1)*P(n-1) = [L(n) + M(n)]*P(n) - M(n+1)*P(n+1) \quad (1)$$

for $n \geq 1$ and $$L(n)*P(n) = M(n+1)*P(n+1) \quad (2)$$

for $n = 0$ where:
n = the number of calls in the queue
L(n) = the arrival rate with n calls in the queue
M(n) = the departure rate with n calls in the queue
P(n) = the probability that n calls are in queue For the predictive dialing system, live calls, i.e. those that are answered by called parties, enter the queue according to a Poisson process, with a constant input rate L for all values of n. Agents become available and respond to live calls according to an exponential distribution, M. There are a limited number of agents, S, and a limit N on the number of calls in queue. Thus, the maximum number of attended plus unattended calls at any time is given by (S+N). The equations (3), (4) and (5) define the probabilities of having a given number of calls in the system.

$$L*P(n) = M*P(n + 1) \quad (3)$$

for $n = 0$ $$L*P(n - 1) = (L + M)*P(n) - M*P(n + 1) \quad (4)$$

for $0 < n < S + N$ $$L*P(n - 1) = M*P(n) \quad (5)$$

for $n = S + N$

From these equations, the equations (6), (7) and (8) can be derived which define the probability of having n calls in the system (i.e. in the queue and being handled by agents).

$$P(0) = \quad (6)$$

$$1/\left[\sum_{n=0}^{S} (R^n/n!) + R^{S+1}/(S*S!)*(1 - R^N/S^N)/(1 - R/S)\right]$$

$$P(n) = R^n*P(0)/n!, \quad (7)$$

for $n < = S$ $$P(n) = R^n*P(0)/(S!*S^{(n-S)}) \quad (8)$$

for $S < n < = S + N$ where:
R=L /M and
! is the factorial function

Steps 116 through 132 comprise a half interval technique for selecting a value for N, which defines the maximum the number of calls in the queue, given the remaining system parameters. At step 116, initial ranges are determined for N, setting the minimum value at 1 and the maximum value at twice the number of agents. The initial value of N is set equal to the midpoint of the range. This value and the process values set in steps 102, 104 and 112 are applied to the above equations to determine the probability density function, P, for the number of calls in the system, the probability, P(0), that the system is empty and the probability, P(N+S), that the system is full. From these probability values, the expected queue wait time, the expected number of calls, the expected queue length, the expected number of busy agents, and the expected number of calls served may be calculated, using the values collected in steps 102, 104 and 112.

At step 118, the range for N is reduced by half, to converge on the N value which satisfies the minimum agent busy-time constraint. If the expected number of busy agents is greater than the target value, then the range for the number N (the maximum number of callers in the queue) may be decreased, so the new range maximum is set to the old midpoint. If the target number of busy agents was not met, however, then the range for N is increased so that there is a larger pool of callers available for the idle agents. In this instance, the new range minimum is set to the old midpoint. If the required average number of busy agents is met exactly, then the final minimum value for N is established. This value represents the smallest maximum queue size that meets the operator busy time requirement.

At step 120, a second range reduction process is performed, to converge on the maximum queue size which complies with the allowable queue waiting time constraint. Given a constant number of agents, the expected queue waiting time, or queue delay, over the interval is directly proportional to the number of callers in the queue. Consequently, the queue delay used in the flowchart diagram is the number of callers in the queue. This process is essentially the same as the process outlined above except that, during each iteration, if the expected maximum queue delay exceeds the preset maximum queue delay, the new range maximum is set to the old midpoint and if the expected maximum queue delay is less than the preset maximum delay value, the new range minimum is set to the old midpoint. If the expected waiting time matches the maximum waiting time then the final maximum value for N is established.

If the expected waiting time does not match the maximum waiting time then, at step 122, the steps 116, 118 and 120 are repeated until the difference between the maximum queue waiting time and the minimum queue waiting time is unity. The maximum queue length is set to the average of the minimum and maximum queue waiting times.

This maximum queue length represents a queue length at which the expected queue delay equals the desired maximum queue delay. The remainder of the program calculates a minimum queue length at which the desired expected number of busy agents is achieved.

At step 126, a further test is made to determine whether the first range for N has converged on a minimum value, for which the required agent busy time is met. If not, then the minimum range is reduced at step 128. Steps 126 and 128 repeats the same processes performed at steps 116 and 118. Steps 126 and 128 are repeated until the difference between the minimum number of busy agents and the maximum number of busy agents is unity. At step 130, the final minimum value of the range for N is set to the N value provided in step 128.

At step 132, the final value for N is set to the average of the final minimum value provided in step 130 (or step 118), and the final maximum value provided in step 124. This value represents a desired queue length which makes a compromise between the maximum wait in the queue and the minimum number of busy agents.

At step 134, the current number of unattended calls in the queue is counted. At step 136, the number of unattended calls is compared to the newly updated desired value of N provided in step 132. If the actual value is less than the desired value, more calls are dialed. If the actual value exceeds that desired number of calls, then the predictive dialing system does not dial any further calls until a new value for N has been calculated using the steps 110 through 132.

Figure 3:
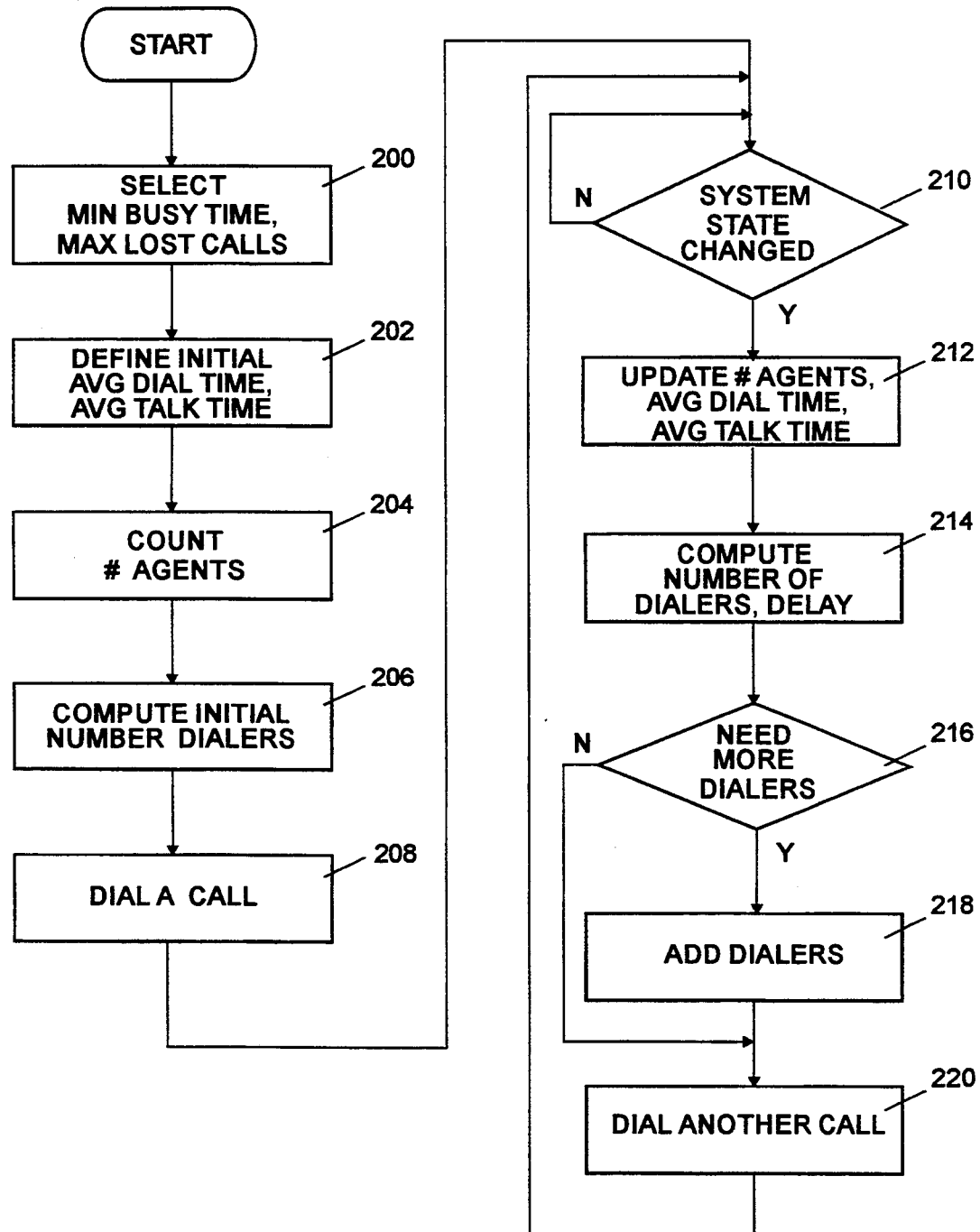
FIGS. 3 and 3a are flow chart diagrams for the scheduling method used in the system shown in FIG. 1, when unattended calls are immediately dropped.
Figure 3A:
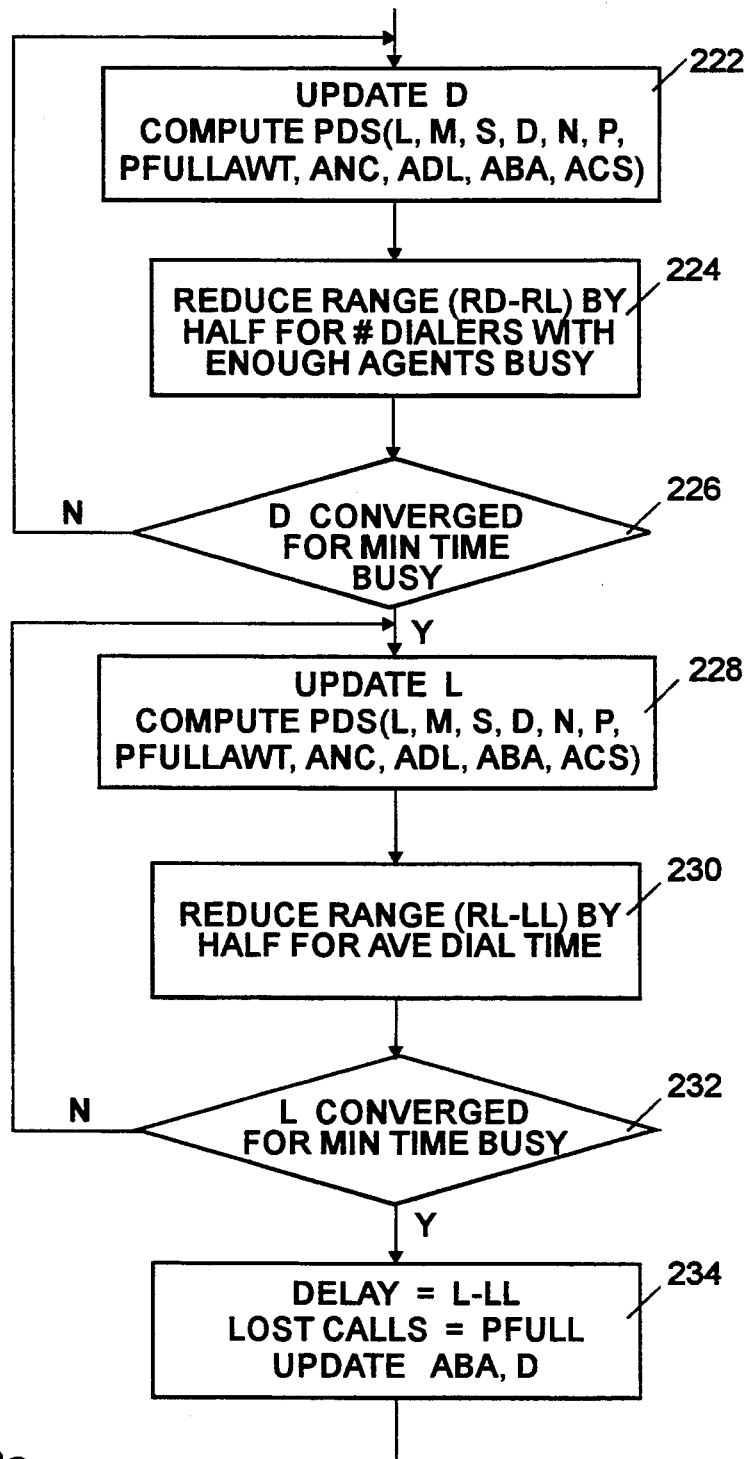

FIG. 3 shows a flow chart of the scheduling method for the predictive dialing system without a call wait queue. At step 200, the system administrator selects initial operating parameters for the system. The two parameters which measure the effectiveness of the system are the percentage of calls which are disconnected because no agent is available, and the number of agents that are engaged in conversation with called parties at any given time. It is desirable that as few callers as possible be disconnected without being served, while the percentage of agent busy time be kept as high as possible.

At step 202, the administrator enters initial estimates for the average dialing time per call and the average time spent by the agent per conversation. The average dialing time includes actual dialing time, plus the time spent waiting for an answer. These estimates may initially be provided using modelling data or estimates based on results from other installations. After the system is in use at an installation long enough to establish smooth operations, empirical data from the campaign may be used.

At step 204, the system counts the number of agents currently available to receive calls. At step 206, an initial estimate for the number of calls for the automatic dialer is computed based on the previously input parameters. The specific algorithm used is described below at step 214.

At step 208, with all initial parameters set, the system is ready to begin automatic dialing of calls. At step 210, the system is in a wait state until a state change occurs. At step 212, when any state change occurs, the number of active agents and the number of calls for the dialer are counted. The average dial time and the average conversation length are updated with the new results.

At step 214, the system employs its scheduling method to update the percentage of lost calls. Step 214 comprises detailed steps 222 through 234. The scheduling method is based the same model and probability density function as in the system with a waiting queue, with one exception. The probability of having n calls in the system is zero for all n greater than S, the number of agents.

Steps 222 through 234 comprise a half interval technique for selecting maximum values for D, the number of active calls for the automatic dialer, and L, the time between automatically generated calls, given the remaining system parameters. At step 222, initial ranges are determined for D, setting minimum value at 0 and the maximum value at the number of agents. The initial value of D is set equal to the midpoint of the range. These values and the above equations are applied to determine the probability density function for the number of calls, P and the probability that the system is full. From these probabilities and the other values entered or collected at steps 202, 204, 206 and 212, the program calculates the expected number of calls; the expected number of busy agents; and the expected number of calls served.

At step 224, the range for D is reduced by half, to converge on the D value which satisfies the constraint on the minimum number of busy agents. The new range maximum is set to the old midpoint, if the required average number of busy agents is exceeded. The new range minimum is set to the old midpoint, if the required minimum number of busy agents is not met. At step 226, a convergence test for D is performed. Steps 222 through 226 are repeated until the difference in the range for D is unity. A final value for D is established if, in any iteration of the algorithm, the expected number of busy agents matches the desired minimum number of busy agents.

At step 228, the minimum value of the range for L is set to the average dialing time, and the maximum value is set to M, the average length of a conversation. The probability density function is again computed. At step 230, new range endpoints are selected to reduce the range between minimum and maximum values of L.

At step 232, a test is made to determine whether the range for L has converged on a minimum value, for which the required agent busy time is met. If not, steps 228 and 230 are repeated until convergence is achieved. If the expected number of busy agents is found to match the minimum number of busy agents for any value of L, this value is selected as the final value.

At step 234, the final delay between calls is computed as the difference between the average dialing time and the original average dialing time. The percentage of lost calls is equal to the probability that the system is full and all agents are unavailable. The values for the desired minimum number of busy agents and the number of calls for the automatic dialer are provided.

At step 216, the current number of calls for the dialer 50 is counted and compared with the result of step 226. If the current value is different from the desired value, the necessary number of additional simultaneous calls for the dialer are activated or deactivated. At step 220, the system continues to dial new calls at a fixed interval, defined by L, and to update system parameters with each state change, in step 210.

It is understood by one skilled in the art that many variations of the embodiments described herein are contemplated. These include different numbers and types of processors and display terminals, different types of voice I/O devices, and different communications protocols. The effect of any of these changes would be readily understood by one of ordinary skill in the art. While the invention has been described in terms of an exemplary embodiment, it is contemplated that it may be practiced as outlined above with modifications within the spirit and scope of the appended claims.

We claim:

1. A control system for a telephone data collection network including an automatic dialer coupled to a private branch exchange, a plurality of telephone sets and a respective plurality of computer terminals each having a video monitor and an input device, and each assigned to one of a plurality of agents, said control system comprising:

means for initiating calls by the automatic dialer;

means for detecting that one of the agents is available to receive a call;

means for assigning one of the initiated calls to the available agent; and telephone line control means, coupled to the computer terminal assigned to the agent and to the private branch exchange, for facilitating telephone keypad functions and for controlling the connection between the private branch exchange and the telephone set assigned to the agent via commands entered by the agent into the computer terminal using the input device;

wherein the telephone data collection network further includes a plurality of loudspeakers positioned to provide audio information to the agents, wherein the control system further comprises:

means for one of the agents to initiate an intercom call by manually entering commands at the terminal input device;

broadcasting said intercom calls over the loudspeakers; and means coupled to at least one of said plurality of computer terminals not assigned to the one agent for establishing a connection with the one agent by using the input device associated with the one terminal not assigned to the agent.

2. A telephone data collection network which provides a continuous series of telephone calls to a plurality of agents, the network comprising:
- a data source computer;
- a server computer;
- an automatic dialer coupled to the source computer and to the server computer;
- a plurality of computer terminals coupled to the server computer;
- a plurality of voice communication devices each assigned to a respectively different one of the plurality of computer terminals and having a display device and an input devices;
- means for providing data communications between the automatic dialer and the data source computer using a first communications protocol;
- means for providing data communications between the automatic dialer and the server computer using a second communications protocol;
- means, coupled to said automatic dialer, for providing protocol conversion between said first and second communications protocols during a first time interval;
- means for transmitting phone number data from the data source computer, through the automatic dialer, to the server computer during said first time interval; and
- means, coupled to said server computer, for causing the automatic dialer to initiate calls during a second time interval, exclusive of said first time interval.

3. A telephone data collection network set according to claim 2 further comprising:
- means, coupled to the server computer, for accumulating data during said continuous series of telephone calls; and
- means for transmitting the accumulated data from the server computer, through the automatic dialer, to the data source computer during a third time interval, exclusive of the first and second time intervals.

* * * * *